United States Patent [19]
Thomas et al.

[11] B 3,920,109
[45] Nov. 18, 1975

[54] GEAR SHIFT WITH POSITIVE LOCK MEANS

[75] Inventors: David F. Thomas, West St. Paul; William L. Kafka, Roseville, both of Minn.

[73] Assignee: Waterous Company, South St. Paul, Minn.

[22] Filed: Oct. 12, 1973

[21] Appl. No.: 405,938

[44] Published under the Trial Voluntary Protest Program on January 28, 1975 as document no. B 405,938.

[52] U.S. Cl. ............................................... 192/114
[51] Int. Cl.² ...................................... F16d 13/60
[58] Field of Search ............ 192/114, 114 T, 48.91; 74/475, 540, 625, 527, 531

[56] References Cited
UNITED STATES PATENTS

| | | | |
|---|---|---|---|
| 2,110,964 | 3/1938 | Ridgeway......................... | 192/114 X |
| 2,760,385 | 8/1956 | Fuchs................................ | 74/625 |
| 2,785,783 | 3/1957 | Homrig et al...................... | 192/114 |
| 2,988,189 | 6/1961 | Thomas et al. .................. | 192/89 R X |
| 3,189,149 | 6/1965 | Thomas et al. ..................... | 192/82 R |
| 3,603,175 | 9/1971 | Horton............................... | 74/625 |
| 3,800,617 | 4/1974 | Dornan.............................. | 74/475 |

*Primary Examiner*—Samuel Scott
*Assistant Examiner*—Lance W. Chandler

[57] ABSTRACT

A shift collar is mounted in a gear case to rotate with a drive gear and to slide longitudinally on it. It is shiftable between an unengaged position and first and second engaged positions in which it causes concentrically mounted first and second driven gears to be driven responsive to the rotation of the drive gear. This movement of the shift collar is accomplished by movement of an attached shift fork which is freely pivotally mounted on a shift shaft. Movement of the shift fork is accomplished by rotation of the shift shaft to cause rotation of a locking, crank arm assembly. This assembly includes a pinion gear rotatably mounted on the gear case and is rotatable by means of a rack-like sector gear extending outwardly from and fixedly mounted to the shift shaft. The locking crank arm assembly also includes an upwardly extending stud in offset relationship to the pinion gear, this stud being effective to cause the shift fork to move the shift collar into and out of the engaged positions upon rotative movement of the shift shaft. Positioning of the crank arm stud in alignment with the crank arm pinion gear relative to the longitudinal axis of the drive gear forms a positive lock to prevent movement of the shift fork, and this prevents any accidental disengagement of the shift collar.

6 Claims, 6 Drawing Figures

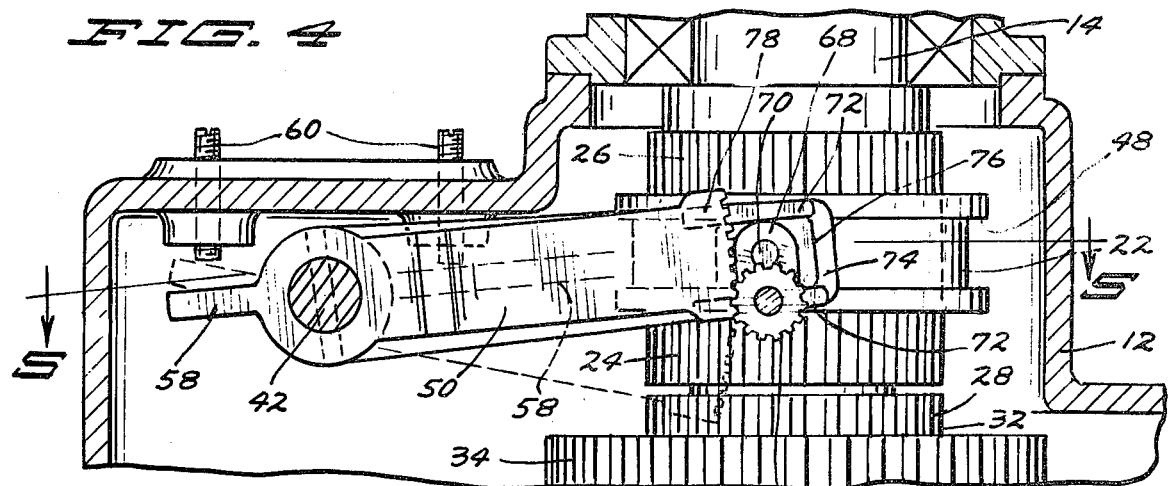
FIG. 4
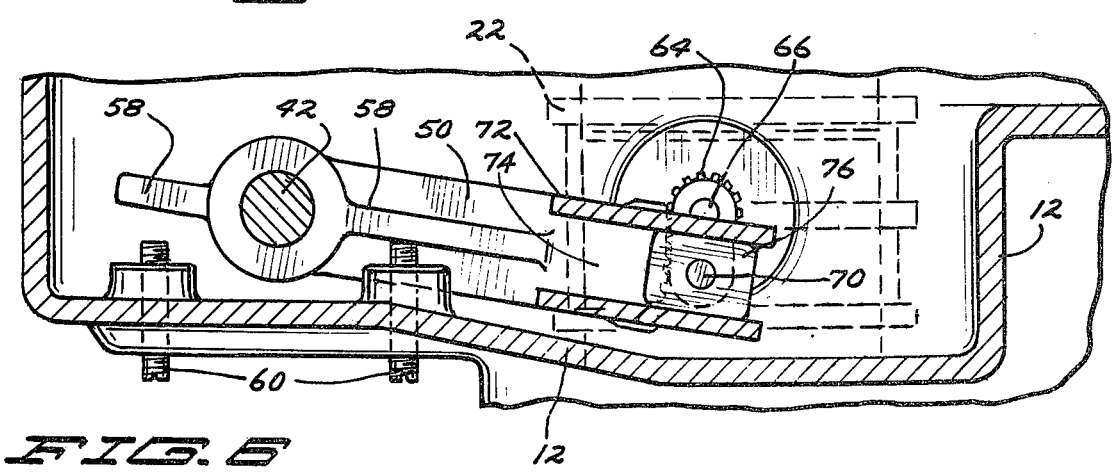
FIG. 5
FIG. 6

GEAR SHIFT WITH POSITIVE LOCK MEANS

BACKGROUND OF THE INVENTION

This invention has relation to a gear shift mechanism employing a splined shift collar slidably situated on a drive gear to rotate with that gear, the collar being slidable to encompass a portion of an adjacent concentrically mounted driven gear thus to cause the driven gear to rotate with the drive gear. Specifically, the invention has relation to this kind of a gear shift mechanism employed to connect and disconnect the ground wheel drive of a fire vehicle from the engine of that vehicle and employed to connect and disconnect a gear train driving a fire pump from the same engine of the vehicle. Similar structures are disclosed in U.S. Pat. Nos. 2,988,189; 2,995,092; and 3,189,149. The disclosure of these patents is incorporated in this specification by this reference to them.

In structures made according to the prior art, a shift fork is pivotally mounted at a substantial distance from the common axis of the drive and driven gears, and shifter shoes pivotally mounted in fork ends of the shift fork are situated to run in a race provided in the shift collar. The shift fork is pinned to the shift shaft, and the shaft is rotated to cause the shift fork to move the shift collar into and out of engagement. Any dynamic forces, due to vibration or sudden shock or due to any other cause, can be operative to tend to force the shift collar out of engagement with a driven gear. Such forces are, at times, so intense that the shift fork, supported as it is only back on the shift shaft, is not effective to prevent all of the movement of the shift collar and the shift collar can, under extreme circumstances, actually jump out of engagement with the driven gear. Obviously this is completely unsatisfactory where an emergency vehicle such as a fire vehicle is involved. It is also unsatisfactory and dangerous wherever power transmission trains using such gear shifting arrangements are involved.

What was needed, prior to the present invention, was a means for positively locking the shift collar against longitudinal movement in the direction of the axis of the drive and driven gears.

SUMMARY OF THE INVENTION

In order to positively lock and hold an internally splined shift collar in engagement with externally splined drive and driven gears concentrically mounted in a gear case, a non-rotating shift fork is forced and held against a side wall of a race provided in the shift collar by means of a pinion-operated crank arm pivotal about a pinion pivot pin on the gear case on a pinion axis at right angles to and passing through the axis of the drive and driven gears.

In the form of the invention as shown, the shift fork is freely rotatable about a shift shaft which has an axis parallel to the pinion pivot pin axis but spaced outwardly therefrom to lie in a plane which includes the pinion axis and which passes at right angles through the axis of the drive and driven gears. A sector gear is also pivotal about the axis of this shift shaft and includes rack-like section in operative meshing relationship with the pinion, and means is provided for moving the sector gear about the shift shaft axis to rotate the pinion to the position where the crank arm exerts its force on the shift collar along a line substantially in alignment with the axis of the drive and driven gears.

Means are provided in the gear case for limiting the rotation of the sector gear so that the maximum movement of that gear in either direction will coincide with alignment of the crank arm with the axis of the drive and driven gears.

In the form of the invention shown, the means for forcing the sector gear to operate the gear shift and lock is the shift shaft itself, together with a shift arm fixedly mounted on the shift shaft and means for fixedly mounting the sector gear on that shaft.

IN THE DRAWINGS

FIG. 1 is a cross-sectional view of a gear case and gears for driving a vehicle-mounted centrifugal fire pump and showing its relationship to such a pump, and to a drive shaft for alternatively driving the pump and the wheels of such vehicle;

FIG. 4 is a sectional view taken on the line 4—4 in FIG. 3;

FIG. 5 is a sectional view taken on the line 5—5 in FIG. 4; and

FIG. 6 is a sectional view taken on the line 6—6 in FIG. 5.

DESCRIPTION OF PREFERRED EMBODIMENTS

Figure 2:
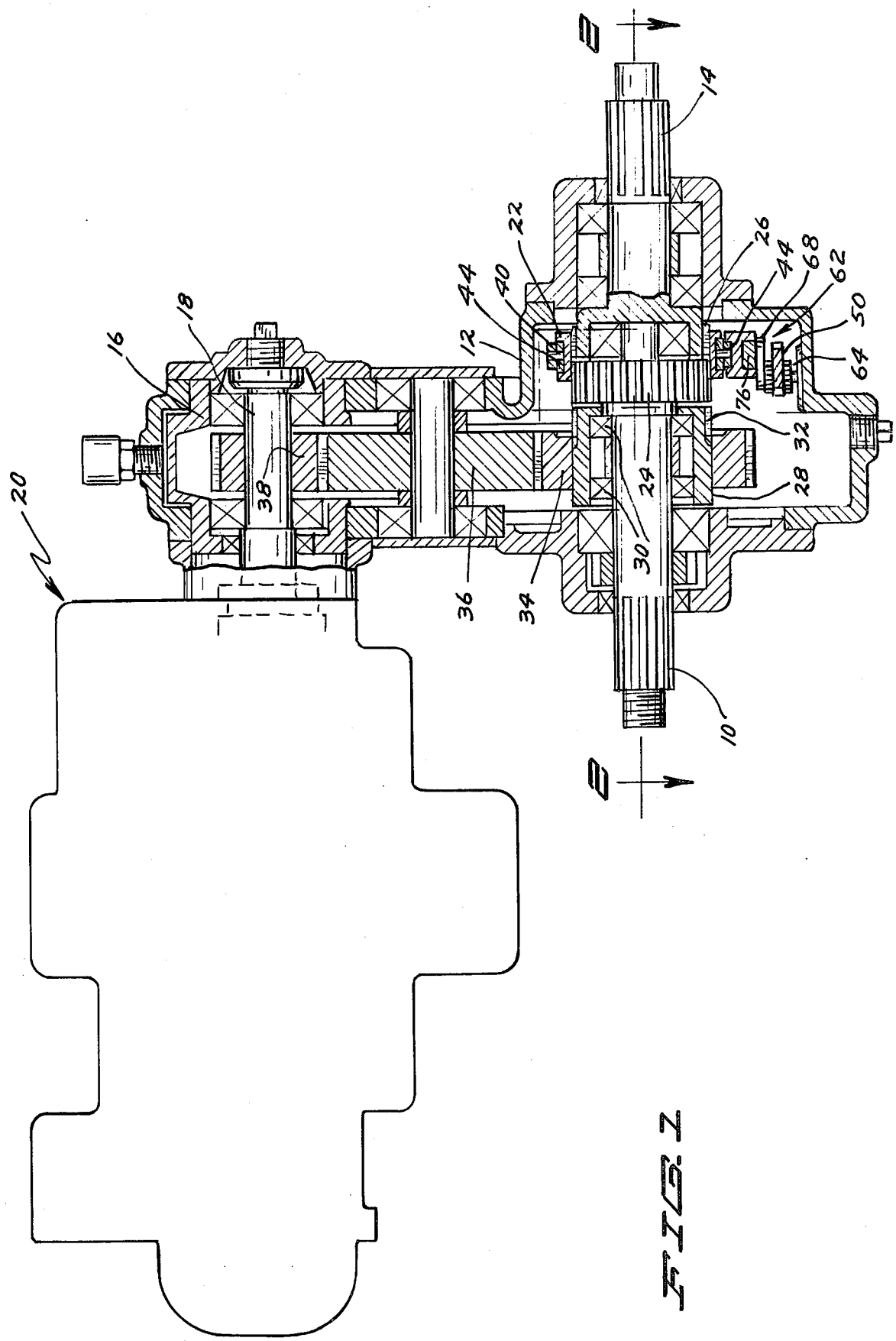
FIG. 2 is an enlarged sectional view taken on the line 2—2 in FIG. 1.
Figure 2:
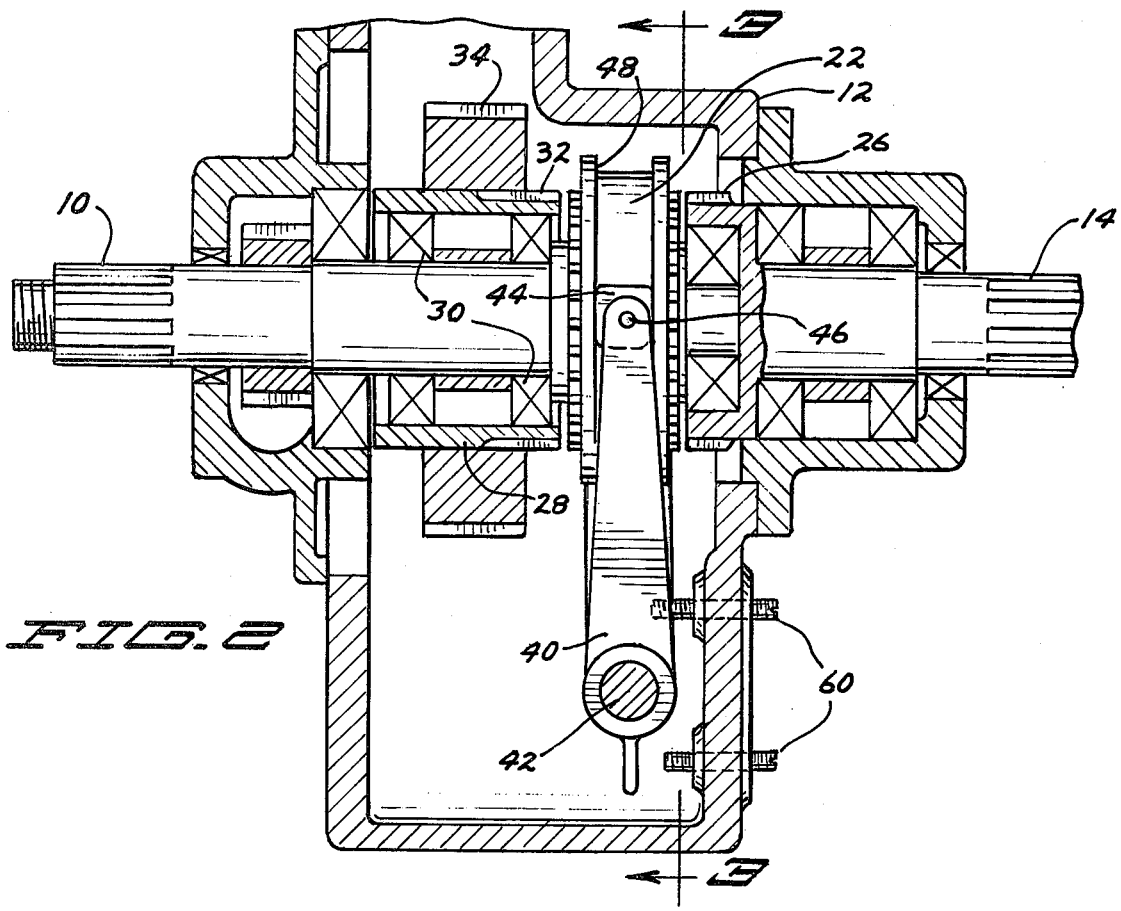

A drive shaft 10 from a vehicle engine (not shown) is rotatably mounted in a gear case 12 in axial alignment with a driven shaft 14 which can be connected to a differential or other mechanism (not shown) in order to drive the vehicles' wheels in any usual or preferred manner. A bearing housing 16 is mounted in the gear case 12 and rotatably supports an impeller drive shaft 18 extending outwardly from a centrifugal fire pump 20. The fire pump, gear case including bearing housing, drive shaft and driven shaft will be mounted on the frame of the fire engine vehicle in any usual or preferred manner, the details of which form no part of the present invention.

A shift collar 22 is internally splined to rotate with, and to slide axially along, a drive gear 24. Drive gear 24 is integral with, and an enlargement of, an end portion of drive shaft 10. Driven shaft 14 includes an integral coupling gear 26, having external splines identical to those of drive gear 24. This gear 26 is situated in spaced, facing relation to the face of the drive gear so that movement of shift collar 22 to encompass both part of drive gear 24 and part of coupling gear 26 will result in rotation of driven shaft 14 responsive to rotation of drive shaft 10.

A coupling collar 28 is rotatably supported on bearings 30,30 in concentric relation to the drive shaft 10, and includes an external gear 32 having external splines identical to the splines of drive gear 24. Gear 32 is in spaced, facing relation to the opposite face of drive gear 24. Movement of shift collar 22 to encompass a portion of the external gear 32 and a portion of drive gear 24 will cause coupling collar 28 to be rotated responsive to rotation of drive shaft 10.

The drive train from external gear 32 includes a drive gear 34 which is keyed to the coupling collar 28 to be integral therewith; an idler gear 36 meshing with drive gear 34; and a driven gear 38 meshing with the idler gear. Driven gear 38 is fixedly mounted on impeller drive shaft 18 to cause the impeller shaft to rotate with the rotation of the driven gear. These gears are all supported on shafts and bearings in the gear case or bearing housing as shown or in any usual or preferred manner forming no part of the present invention.

A shift fork 40 is pivotally mounted for free swinging movement on a shift shaft 42, and has shifter shoes 44 pivotally mounted to its outer fork ends as at 46 to ride in a shift collar race 48 provided in shift collar 22. Pivotal movement of the shift fork 40 about shift shaft 42 causes movement of shift collar 22 longitudinally along the axis of the drive shaft 10 to connect that drive shaft drivingly with driven shaft 14, or with coupling collar 28, or to situate it in an intermediate position where the drive shaft is not drivingly connected with either of these elements.

Previous to the present invention, movement of the shift fork and consequently the shift collar had been accomplished by fixedly positioning the shift fork on the shift shaft and by rotating that shaft. However, any dynamic forces imposed on the shift collar tending to move it axially (to make it jump out of gear) are transmitted through the shifter shoes to the shift fork. Where such forces become strong enough, the shift fork and shift shaft are not always effective to prevent the shift collar from moving sufficiently to keep it from jumping out of gear.

To overcome this tendency, and to positively lock the shift fork and consequently the shift collar against lateral movement of the shift collar, the shift fork is mounted on the shift shaft to pivot freely around the shaft, and a sector gear 50 is mounted on the shift shaft and is pinned to it as at 52 to insure its rotation with the shaft. A shift arm 54 is likewise pinned to the shaft as at 56. This shift arm can be manually or electrically operated and can include an over-center mechanism for insuring that it stays in either of the two engaged positions. However, this means of operating the shift arm forms no part of the present invention.

Figure 3:
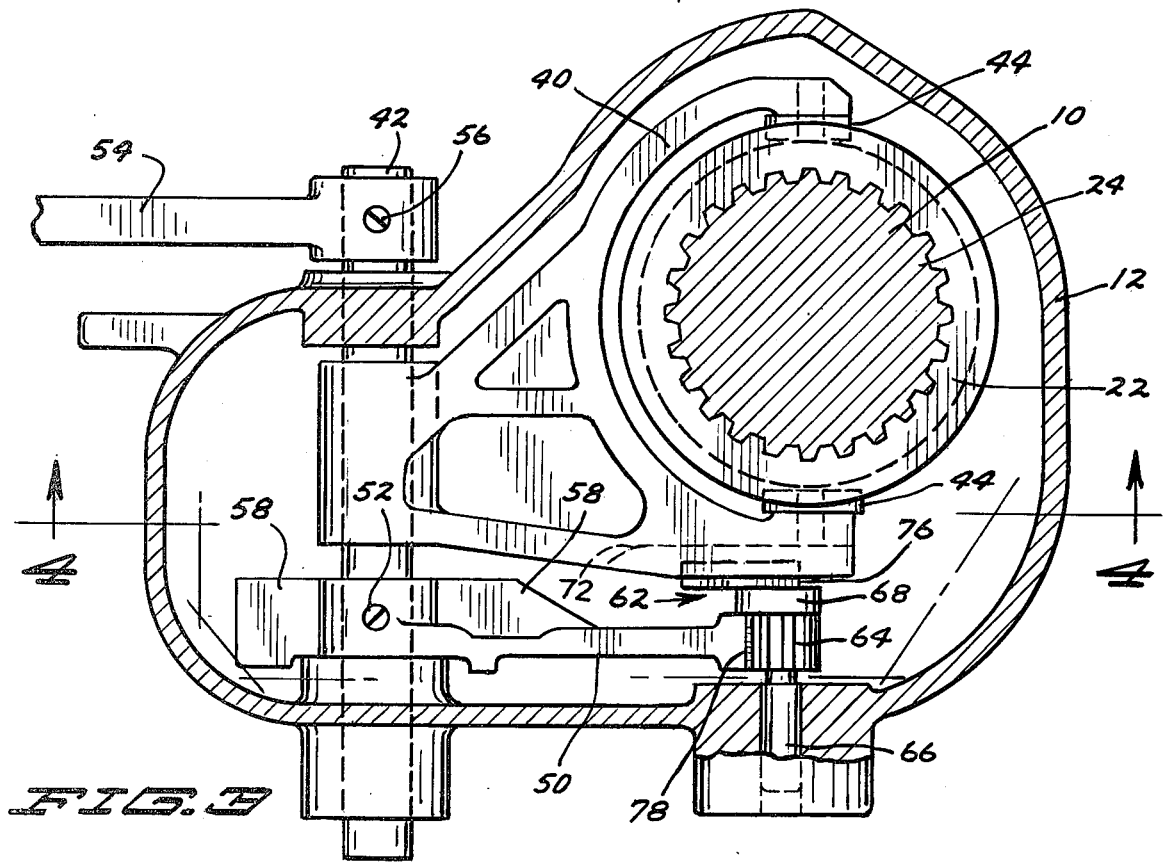
FIG. 3 is a further enlarged sectional view taken on the line 3—3 in FIG. 2.

The shift shaft 42 is mounted in gear case 12 as perhaps most clearly seen in FIGS. 3 and 5. Sector gear 50 includes a web 58 extending radially outwardly from the shift shaft in opposite directions. Adjustable set screws 60,60, threadably mounted in the gear case 12 are in position to limit the movement of the sector gear in each direction. This is shown in full lines in FIG. 6 and in dotted lines in FIG. 4.

A locking crank arm assembly 62 includes a pinion gear 64 freely rotatably mounted on a pivot pin 66 which is mounted in the gear case 12. Integral with the pinion gear, and also forming part of the crank arm assembly 62, is a flat plate 68, which has an integral shifter shoe stud 70 extending upwardly therefrom in direction opposite the pinion gear. As perhaps best seen in FIGS. 5 and 6, the lower edge of shift fork 40 is provided with downwardly extending, parallel, spaced apart walls 72,72 forming a slot or channel 74 in which a shifter shoe 76 can slide as it rides on flat plate 68 and pivots about the shifter shoe stud.

Pinion gear 64 is of size and is positioned to mesh with a rack-like section 78 of gear teeth which extend outwardly from and form a working part of sector gear 50.

OPERATION

Initially the gear shift apparatus of the present invention will be positioned with parts as seen in FIGS. 1, 4, 5 and 6. That is to say, the shift arm 54 will have been manually or electrically operated to rotate shift shaft 42 in direction to cause the gear teeth of rack-like section 78 of the sector gear 50 to rotate pinion gear 64 in direction to move shifter shoe stud 70 of crank arm assembly 62 in direction toward driven shaft 14. This will have caused the shifter shoe 76, sliding in channel 74 of the shift fork 40 to force that shift fork in direction toward said driven shaft 14. The shifter shoes 44, moving with the outer fork ends of the shift fork and running in shift collar race 48 will have moved the shift collar in the same direction, thus causing it to encompass not only drive gear 24 but also coupling gear 26 integral with driven shaft 14.

With the parts in this position, the engine on the fire vehicle will drive its wheels in the usual manner. Upon arriving at a location for use of the centrifugal fire pump, shift arm 54 will be rotated in the opposite direction to cause the shift shaft, sector gear, crank arm assembly 62, shifter shoe 76, one of the walls 72, the shift fork 40, and shifter shoes 44 to move the shift collar 22 through a neutral position where it is running only with drive shaft 10 to a position where it engages also external gear 32 of coupling collar 28, thus to drive through the above described gear train to the end that the impeller drive shaft 18 be rotated and the fire pump perform its intended function.

It is to be expected that certain vibrations and other dynamic forces can develop under high speed and maximum power usage of the fire pump. These forces can tend to move the shift collar out of engagement with external gear 32. Similarly, when the fire vehicle body is being driven over the road, certain vibrations and other dynamic forces can tend to move the shift collar out of engagement with coupling gear 26. As perhaps most clearly seen in FIGS. 4 and 6, any movement of the shift collar 22 in direction toward "neutral," or, in other words, in out-of-gear direction, is effectively prevented by shifter shoes 44, the outer fork ends of the shift fork 40, the shifter shoe 76, and stud 70, flat plate 68, and pinion gear 64 of the crank arm assembly 62 working against pivot pin 66 which is firmly mounted in the gear case 12.

Thus, instead of having the long arm of the shift fork 40 between the shift collar 22 and the shift shaft 42 to attempt to prevent disengagement of the shift collar, the present invention presents a direct mechanical blockage right along the line of the axis of the drive shaft in order to prevent any movement of the shift collar 22. It is to be noted in FIG. 4, for example, that the axis of the shifter shoe stud 70 is substantially in alignment with the axis of the pivot pin 66 which is firmly mounted in the gear case 12. As pointed out above, the limits of rotative movement of the sector gear 50, are controlled by the positioning of set screws 60,60 and by the web 58 of the sector gear coming in contact with the ends of these set screws. Thus, the resistance to movement of the shift collar along the axis of the drive shaft is positive and forms a positive lock against such movement.

It is to be understood that by retracting the set screws 60,60 slightly more than shown, the crank arm assembly can be rotated to positions which are slightly beyond "dead center." That is to say the sector gear 50 will carry the crank arm assembly beyond the point where the axis of the shifter shoe stud 70 is in alignment with the axis of pivot pin 66. When so adjusted, any tendency of the shift collar to move out of engagement, thus exerting a force through the shift fork onto the crank arm assembly, will tend to move the sector gear into even firmer contact with the particular set screw 60. Thus to more force on the shift collar tending to force it out of engagement, the more force is exerted in reaction by the set screws 60 and the sector gear and crank arm assembly tending to hold it in engagement.

The embodiments of the invention in which an exclusive property or privilege is claimed are defined as follows:

1. In a power transmission train including a gear case, a drive gear rotatably mounted in said gear case, at least one driven gear rotatably mounted in concentric, end-to-end relation to a first end of the drive gear, a shift collar splined to the drive gear to be rotatable with it, the shift collar being slidable longitudinally of the drive gear to driveably encompass a portion of the driven gear, said shift collar being provided with an outer race, a shift fork, means on said shift fork to ride in said shift collar race, a shift shaft mounted in said gear case in spaced relation to the axis of said drive gear and said driven gear and having an axis perpendicular to a plane including the axis of said drive gear, said shift fork being pivotally supported on said shift shaft to move said shift collar between a position where it is in engagement with said driven gear and a position where it is out of engagement therewith, the improvement including:
A. a sector gear pivotally mounted on said shift shaft and having a rack-like section of gear teeth extending in direction outwardly from said shift shaft;
B. a crank arm assembly including a pinion gear pivotally mounted on said gear case in position to be in meshing relation to said sector gear teeth, and an oppositely extending stud, having an axis parallel to and offset from the axis of said pinion gear;
C. said shift fork being provided with an elongated channel lying in direction substantially transverse to that of the axis of said drive gear and said driven gear, said channel being of size to receive said crank arm stud, the stud being free to slide with respect to said channel; and
D. means for rotating said sector gear about the axis of said shift shaft alternatively in direction to rotate the pinion gear to cause the crank arm stud to move the shift fork in direction to move the shift collar into and out of engagement with the driven gear.

2. The gear shift of claim 1 and stop means associated with said sector gear, said stop means being operative to stop movement of said sector gear in direction to cause said shift collar to move into engagement when a plane including the axis of said crank arm stud and the axis of said crank arm pinion gear is in substantially coincident, parallel alignment with the axis of the drive gear.

3. The gear shift of claim 2 wherein said means to rotate said sector gear includes means to pin said sector gear to said shift shaft and a shift arm for rotating said shift shaft.

4. The gear shift of claim 3 and a second drive gear rotatably mounted in concentric, end-to-end relation to a second end of said drive gear, and means to rotate said sector gear in an opposite direction to cause said shift collar to drivably encompass a portion of said second driven gear.

5. The gear shift of claim 1 and stop means associated with said sector gear, said stop means being operative to stop movement of said sector gear in direction to cause said shift collar to move into engagement after a plane including the axis of said crank arm stud and the axis of said crank arm pinion gear has moved past coincident, parallel alignment with the axis of the drive gear.

6. In a power transmission train including a gear case, a drive gear rotatably mounted in said gear case, at least one driven gear rotatably mounted in concentric, end-to-end relation to a first end of the drive gear, a shift collar splined to the drive gear to be rotatable with it, the shift collar being slidably longitudinally of the drive gear to drivably encompass a portion of the driven gear, said shift collar being provided with an outer race, a shift fork, means on said shift fork to ride in said shift collar race, a shift shaft mounted in said gear case in spaced relation to the axis of said drive gear and said driven gear and having an axis perpendicular to a plane including the axis of said drive gear, said shift fork being pivotally supported on said shift shaft to move said shift collar between a position where it is in engagement with said driven gear and a position where it is out of engagement therewith, the improvement including:
A. a sector gear pivotally mounted on said shift shaft and having a rack-like section of gear teeth extending in direction outwardly from said shift shaft;
B. a crank arm assembly including a pinion gear pivotally mounted on said gear case in position to be in meshing relation to said sector gear teeth, a plate integral with said pinion gear, and a shifter shoe stud mounted on said plate at a side thereof opposite said pinion gear, said stud having an axis parallel to and spaced from the axis of said pinion gear;
C. a crank arm shifter pivotally mounted on said shifter shoe stud;
D. said shift fork being provided with an elongated channel lying in direction substantially transverse to that of the axis of said drive gear and said driven gear, said channel being of size to snugly receive said crank arm shifter shoe, the shoe being free to slide in said channel but being of size to prevent movement of said shaft arm in the direction of the axis of said drive and driven gears; and
E. means for rotating said sector gear about the axis of said shifter shaft alternatively in direction to rotate the pinion gear to cause the crank arm stud and shifter shoe to move the shift fork in direction to move the shift collar into and out of engagement with the driven gear.

* * * * *